United States Patent Office 2,797,428
Patented July 2, 1957

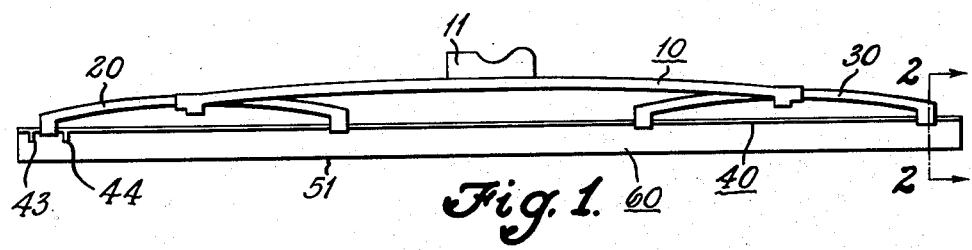
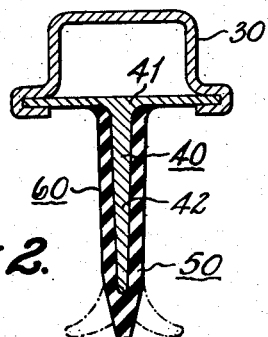
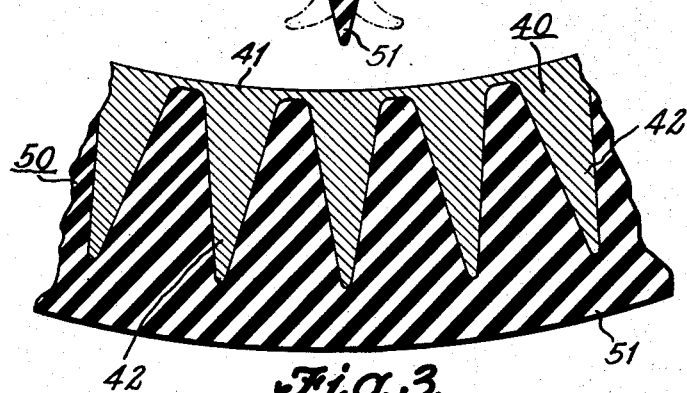
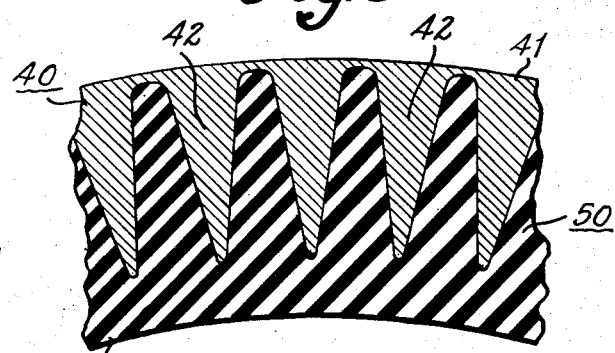
INVENTOR.
CYRIL T. WALLIS

2,797,428

FLEXIBLE SQUEEGEE

Cyril T. Wallis, Brockport, N. Y., assignor to General Motors Corporation, Detroit, Mich., a corporation of Delaware Application August 20, 1954, Serial No. 451,241

6 Claims. (Cl. 15—245)

This invention pertains to the art of window cleaning, and particularly to a flexible wiping element especially adapted for cleaning curved vehicular transparencies.

Present day squeegee assemblies comprise two separate and distinct members, i. e. an elongate, readily flexible wiping element of resilient material and a backing strip of metal which is substantially uniformly, reversely flexible in a plane perpendicular to the surface to be wiped and substantially inflexible in a plane at right angles thereto. The wiping element is carried by the backing strip so as to be freely tiltable relative thereto, and the backing member is operatively connected to pressure distributing means at longitudinally spaced points. I have observed that this type of blade assembly does not properly clean a sharply curved vehicular transparency, commonly known as a wraparound windshield, due to the fact that the wiping element "crowds" the windshield surface, as pointed out in my copending application, Serial No. 428,565, filed April 23, 1954. However, these problems are obviated with the squeegee construction of this invention. Accordingly, among my objects are the provision of a squeegee particularly designed for wiping curved surfaces; the further provision of a squeegee having an integral backing member which is freely flexible in a plane perpendicular to the surface to be wiped; the further provision of a squeegee including an embedded member having portions located proximate the wiping edge for limiting the angular tilting thereof; and the still further provision of a squeegee including means for attaching it to a pressure distributing lever system.

The aforementioned and other objects are accomplished in the present invention by utilizing a backbone member having an elongate, longitudinally extending backing strip portion with a plurality of spaced, integral, transversely extending tines, or teeth, extending therefrom, and about which resilient material is molded, or cemented. Specifically, the backbone member is generally of comb-shaped configuration so as to be substantially uniformly flexible in a plane perpendicular to the surface to be wiped, and substantially rigid in a plane at right angles thereto. The elongate backing strip portion of the backbone is of substantial width as compared to the transversely extending teeth. In addition, the backing strip portion may be formed with integral spaced ears at one or both ends to facilitate its interconnection with a pressure applying lever assembly so as to limit relative longitudinal movement therebetween.

The elongate flexible wiping element of rubber, or rubber-like, material may be either molded around the teeth or cemented thereto. In any event, the teeth terminate short of the end of the wiping element so as to leave a freely tiltable wiping edge portion. The backbone may be composed of either plastic, metal or a hard rubber. The squeegee assembly of this invention is capable of effecting vastly superior cleaning of sharply curved vehicular transparencies by reason of the embedded backbone teeth which limit tilting of the wiping edge, while the entire backbone structure results in a squeegee which is reversely flexible in a plane perpendicular to the windshield and relatively inflexible in a plane transverse thereto.

Further objects and advantages of the present invention will be apparent from the following description, reference being had to the accompanying drawing wherein a preferred embodiment of the present invention is clearly shown.

In the drawing:

Fig. 1 is a side view, in elevation, of a blade assembly having a squeegee element constructed according to the present invention.

Fig. 2 is an enlarged, sectional view taken along line 2—2 of Fig. 1.

Fig. 3 is a fragmentary, sectional view illustrating squeegee operation on a concave surface.

Fig. 4 is a fragmentary, sectional view illustrating squeegee operation on a convex surface.

With reference to Fig. 1, the improved squeegee of this invention is depicted in combination with conventional pressure distributing means. The conventional pressure distributing means, or equalizing lever system comprises a primary yoke 10 having means 11 designed to detachably connect the wiper blade assembly to the free end of a wiper arm, not shown. Opposite ends of the primary yoke 10 are movably connected to the intermediate portions of a pair of secondary yokes 20 and 30. All of the yokes are generally of channel shape, and opposite ends of the secondary yokes 20 and 30 are movably connected to the integral backbone member 40 of the flexible squeegee 60.

With reference to Figs. 2 through 4, the construction of the flexible squeegee 60 will be described in detail. The squeegee includes a flexible backbone member 40 having an integral backing strip portion 41, which is of substantial width, as shown in Fig. 2. The backbone also includes a plurality of tines, or teeth, 42, which extend in a plane transverse to the backing strip portion 41, as shown in Figs. 2 and 3. The backbone 40 is generally of comb-shaped configuration, and, hence, the teeth 42, which are integral with the backing strip portion 41 are spaced longitudinally therealong. Furthermore, the teeth are of tapering section throughout their length in both directions, as viewed in Figs. 2 and 3.

The backbone construction 40 is substantially freely flexible in a plane perpendicular to the surface to be wiped. However, by reason of the backing strip portion 41 being of substantial width, the backbone 40 is substantially rigid in a plane located at right angles to the surface to be wiped. The backbone 40 may be composed of plastic, metal or hard rubber. The peripheral edge portions of the backing strip portion 41 are arranged to be received by the channel-shaped ends of the secondary yokes 20 and 30. Moreover, if desired, one or both ends of the backing strip 41 may be formed with integral, depending, longitudinally spaced ears 43 and 44, disposed on opposite sides of the interconnection of the secondary yokes and the backing strip so as to limit relative longitudinal movement therebetween and prevent inadvertent separation of the pressure distributing means and the flexible squeegee.

The flexible squeegee 60 also includes a resilient wiping element 50, which may be either molded around the teeth of the backbone or cemented thereto. In either event, the teeth terminate short of the end of the wiping element 50, which is preferably composed of rubber, or rubber-like material, so as to leave a freely tiltable wiping edge portion 51. The degree of flexibility of the squeegee 60 can be modified by varying the cross sectional area of the embedded teeth 42. Furthermore, by terminating the teeth proximate the edge of the wiping element 50, the angular tilt of the wiping edge 51 relative to the squeegee can be controlled within very close limits.

With particular reference to Figs. 3 and 4, it is readily apparent that the squeegee assembly of this invention is freely flexible in a plane perpendicular to the surface to be wiped. Accordingly, the squeegee element will readily conform to either a convex, or a concave, surface, as shown in Figs. 3 and 4. Furthermore, tilting of the wiping edge 51 is limited by the teeth 42, as depicted in Fig. 2, so as to prevent undesirable "crowding" of the resilient wiping element against the surface of a sharply curved vehicular transparency.

While the squeegee of this invention is shown depicted in conjunction with a conventional equalizing lever system, it will be appreciated that this is only by way of example and is not to be construed as a limitation. For example, the squeegee element could very readily be used in conjunction with the pressure applying means disclosed in my aforementioned copending application, Serial No. 428,565. In addition, the strip-like portion 41 may be of uniform thickness throughout its length, or one or both outer end portions may be gradually tapered in thickness so as to increase its flexibility in a plane perpendicular to the surface to be wiped.

While the embodiment of the present invention as herein disclosed, constitutes a preferred form, it is to be understood that other forms might be adopted.

What is claimed is as follows:

1. A squeegee for cleaning a curved surface comprising, an elongate resilient member having a wiping edge extending lengthwise thereof, and a flexible backbone embedded in said resilient member comprising a relatively wide backing strip portion having a plurality of longitudinally spaced teeth extending therefrom which terminate short of the wiping edge, said teeth being gradually tapered from their roots to their tips.

2. A squeegee for cleaning a curved surface comprising, an elongate resilient member having a wiping edge extending lengthwise thereof, and a flexible backbone incorporated in said resilient member including a plurality of longitudinally spaced teeth which terminate short of the wiping edge whereby the wiping edge is freely tiltable relative to the backbone, said teeth being gradually tapered from their roots to their tips.

3. A squeegee for cleaning a curved surface comprising, an elongate resilient member having a wiping edge extending lengthwise thereof, and a backbone incorporated in said resilient member including a relatively wide backing strip portion having a plurality of integral, longitudinally spaced teeth extending therefrom, said teeth being gradually tapered from their roots to their tips, the roots of said teeth being spaced substantially equidistantly from the longitudinal marginal edges of said backing strip portion, said backbone being substantially uniformly reversely flexible in a plane substantially perpendicular to the surface to be wiped and relatively inflexible in a plane at right angles thereto.

4. A wiper blade for curved surfaces comprising, an elongate resilient member having a wiping edge extending lengthwise thereof, and a flexible backbone incorporated in said member including a plurality of teeth of tapered cross section which are substantially freely flexible in a plane perpendicular to the surface to be wiped.

5. A wiper blade for curved surfaces comprising, an elongate resilient body having a wiping edge extending lengthwise thereof, and a flexible backbone embedded in said member including a backing strip portion substantially wider than said resilient body and a plurality of longitudinally spaced teeth of tapered cross section extending from and integral with said backing strip portion, said teeth being spaced substantially equidistantly from the longitudinal marginal edges of the backing strip portion, said teeth terminating short of the wiping edge of said resilient body whereby the wiping edge is freely tiltable to said backbone.

6. A wiper blade for curved surfaces comprising, an elongate rubber body having a wiping edge extending lengthwise thereof, and a backbone embedded in said rubber body comprising a backing strip portion having means for attaching pressure applying means thereto and a plurality of tapered tines extending therefrom and terminating short of the wiping edge of said rubber body, said tines being spaced substantially equidistantly from the longitudinal marginal edges of the backing strip portion, said backbone being freely flexible in a plane substantially perpendicular to the surface to be wiped and relatively rigid in a plane at right angles thereto.

References Cited in the file of this patent

UNITED STATES PATENTS

| 2,543,383 | Scinta et al. | Feb. 27, 1951 |
| 2,659,097 | Morton | Nov. 17, 1953 |

FOREIGN PATENTS

| 109,121 | Australia | Nov. 15, 1939 |
| 667,253 | Great Britain | Feb. 27, 1952 |
| 820,156 | France | July 26, 1937 |